United States Patent [19]

Hosoi

[11] Patent Number: 5,114,654
[45] Date of Patent: May 19, 1992

[54] METHOD FOR FORMING A PRODUCT HAVING WAVED SURFACE BY BENDING A COMPOSITE MATERIAL SHEET

[75] Inventor: Masanori Hosoi, Tochigi, Japan

[73] Assignee: Fuji Jukogyo Kabushiki Kaisha, Tokyo, Japan

[21] Appl. No.: 570,598

[22] Filed: Aug. 21, 1990

[30] Foreign Application Priority Data

Aug. 28, 1989 [JP] Japan .................... 1-220951

[51] Int. Cl.⁵ ............................... B28B 3/00
[52] U.S. Cl. ...................... 264/313; 156/245; 264/285; 264/292; 264/314; 264/319; 264/324; 425/338; 425/345; 425/353; 425/389; 425/406; 425/408; 425/409; 425/419
[58] Field of Search ........... 425/338, 345, 353, 406, 425/408, 409, 410, 419, 389, 19; 264/285, 284, 319, 292, 313, 314, 324, 316; 156/245

[56] References Cited

U.S. PATENT DOCUMENTS

| | | | |
|---|---|---|---|
| 3,614,811 | 10/1971 | Johnson | 425/DIG. 19 X |
| 4,034,054 | 7/1977 | Sauer | 264/313 X |
| 4,826,420 | 5/1989 | Frey | 425/394 |

FOREIGN PATENT DOCUMENTS

59-129119 7/1984 Japan .
63-134719 9/1988 Japan .

*Primary Examiner*—David A. Simmons
*Assistant Examiner*—Merrick Dixon
*Attorney, Agent, or Firm*—Beveridge, DeGrandi & Weilacher

[57] ABSTRACT

For forming a resin-impregnated, fiber reinforced composite material sheet having laminated meshes of fibers into a U-shaped cross section, the sheet is placed onto a stationary forming die and an auxiliary forming die with the fibers of the sheet forming angles of approximately 45° relative to opposite edges of an upper reference forming surface of the stationary die. Then, the sheet is pressed from above by a pneumatically expandable, elastic depressing die, whereby the auxiliary forming die is lowered against a resilient force relative to the stationary forming die. As the sheet is pressed further downwardly by the depressing die, the parts of the sheet which are to form flanges of the product are firmly held between the depressing die and the auxiliary forming die and bent downwards while the parts are subjected to extending forces in directions to prevent creases and lines from being formed by means of auxiliary forming ridges on the auxiliary forming die.

14 Claims, 9 Drawing Sheets

METHOD FOR FORMING A PRODUCT HAVING WAVED SURFACE BY BENDING A COMPOSITE MATERIAL SHEET

BACKGROUND OF THE INVENTION

The present invention relates to a method for bending and forming a composite material sheet, such as a resin-impregnated, fiber reinforced composite material sheet containing laminated meshes of fibers, and to an apparatus for such bending and forming. More specifically, the invention relates to a method and apparatus for bending and forming a composite material sheet without formation of creases and lines even in the case when there is a curved contour along edges linking a reference surface and flange surfaces of the formed product.

Conventionally, as a method for forming a prepregnated, fiber reinforced composite material sheet containing fibers laminated into a mesh, a method is known such as that disclosed in Japanese Patent Application Laid-Open Publication No. 59-129119, wherein a composite material is conveyed manually sheet by sheet to a forming die and is laminated. Another known method is such as that disclosed in Japanese Utility Model Appln. No. 62-26838 wherein vacuum is used in conjunction with a vacuum bag and side blocks to perform the forming.

Among these conventional forming methods described above, the former method that involves manual laminating by human labor so that deviation occurs in the quality of the formed products and heavy labor is needed when the number of lamination processes increases. In addition to this, when there is laminating with curves, complex hand movements and skill are required in order to form the desired form. There are also the problems of the work time being long and consequently the time limit for effective use of the prepregnated material becoming shorter, therefore making it difficult to laminate large products.

On the other hand, with the latter method involving the vacuum bag, there is the possibility that the work time for the lamination can be reduced and large products can be laminated, but there are instances wherein the force that presses the prepregnated material and the vacuum bag against the side blocks does not operate when the side blocks are lowered, and this creates the problem of creases being formed in portions where the prepregnated material is bent.

In addition, in both of these two conventional methods, there is the problem of creases and lines being formed when bending and forming are performed for a composite material having an undulated reference surface or having curved lines along the edges linking the reference surface and flange surfaces.

SUMMARY OF THE INVENTION

The object of the present invention is to provide a method and apparatus for bending and forming a composite material without the formation of creases and lines even in the case where there is an undulated reference surface or a curve along the edges linking the reference surface and flange surfaces of the formed product.

According to the present invention, in one aspect thereof, the above object is attained by a method for bending and forming a composite material sheet made from laminated meshes of fibers, into a product of U-shaped cross section having a reference surface and a pair of flange surfaces bent angularly along opposite curved edges of the reference surface, said method comprising the steps of placing the composite material sheet onto a stationary forming die having an upper reference forming surface and flange forming surfaces extending downwards from opposite curved edges of the reference forming surface and onto a downwardly movable auxiliary forming die surrounding the stationary forming die and having upwardly concave auxiliary forming ridges on an upper surface thereof, with the fibers of the composite material sheet forming a certain angle relative to said edges of the reference forming surface, pressing the composite material sheet downwards against the stationary forming die and against the auxiliary forming die at parts of the composite material sheet extending beyond said edges of the reference forming surface by means of an expandable elastic depressing die, thereby to move the auxiliary forming die downwards relative to the stationary forming die so as to form the reference surface of the product, and further pressing the composite material sheet by the depressing die to move the auxiliary forming die further downwards with said parts of the composite material sheet being held between the depressing die and the auxiliary forming die, while extending said parts of the composite material sheet by said auxiliary forming ridges in directions to prevent creases and lines from being formed, thereby to form the flange surfaces of the product.

According to the present invention, in another aspect thereof, the object is attained by an apparatus for bending and forming a composite material sheet made from laminated meshes of fibers into a product of U-shaped cross section having a reference surface and a pair of flange surfaces bent angularly along opposite curved edges of the reference surface, said apparatus comprising a stationary forming die having an upper reference forming surface and flange forming surfaces extending downwards from opposite edges of the reference forming surface, said edges being curved, an auxiliary forming die surrounding the stationary forming die and having upwardly concave auxiliary forming ridges on an upper surface thereof, disposed adjacent to said edges of the stationary forming die and extending away from the edges, resilient means for supporting said auxiliary forming die to enable the same to move downwards relative to the stationary forming die against a resilient force, and an expandable elastic depressing die disposed above said stationary and auxiliary forming dies for moving downwards against the forming dies, thereby to form said reference surface of the product against said reference forming die and to form said flange surfaces of the product with the flange surfaces held between the depressing die and the auxiliary forming die which is moving downwards, said auxiliary forming ridges being disposed so as to extend the flange surfaces in directions to prevent creases and lines from being formed while the flange surfaces are being bent downwards in the state held between the depressing die and the auxiliary forming die.

An important feature of the present invention is the forming of the flange surfaces of the product with the flange surfaces firmly held between the upper elastic depressing die and the lower auxiliary forming die. As the elastic depressing die is lowered by the downward pressing movement of the depressing die, portions of the flange surface vicinity of the curved edge thereof are preliminary extended or stretched by the auxiliary forming ridges on the auxiliary forming die to reduce the fiber density at the portions before the bending process begins, thereby preventing forming creases and lines on such portions of the final product.

Preferred embodiments of the present invention will become understood from the following detailed description referring to the accompanying drawings.

DESCRIPTION OF THE PREFERRED EMBODIMENTS

Figure 1:
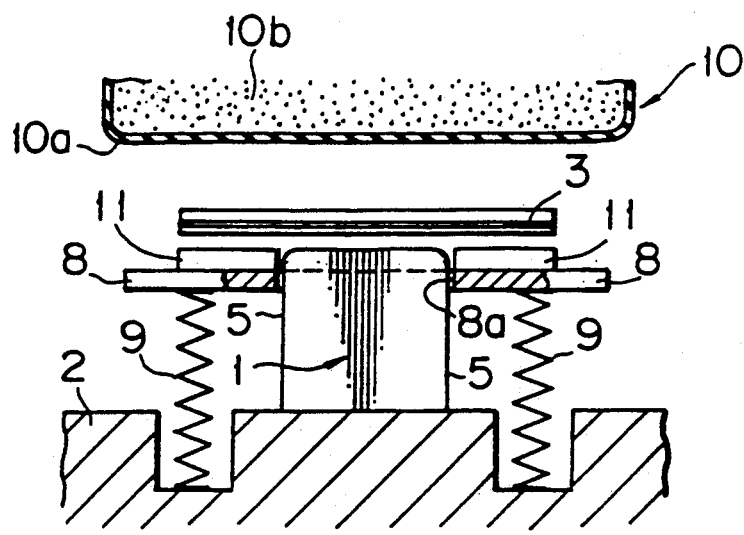
FIG. 1 shows an elevation, partly in section, of an embodiment of an apparatus for bending and forming a composite material, according to the present invention.

FIG. 1 indicates an embodiment of an apparatus for bending and forming a composite material sheet according to the present invention. In the figure, numeral 1 indicates a stationary forming die disposed on a heated base 2. The forming die 1 is heated to a predetermined temperature so as to facilitate the forming of a resin prepregnated composite material sheet 3 to be described later.

Figure 2:
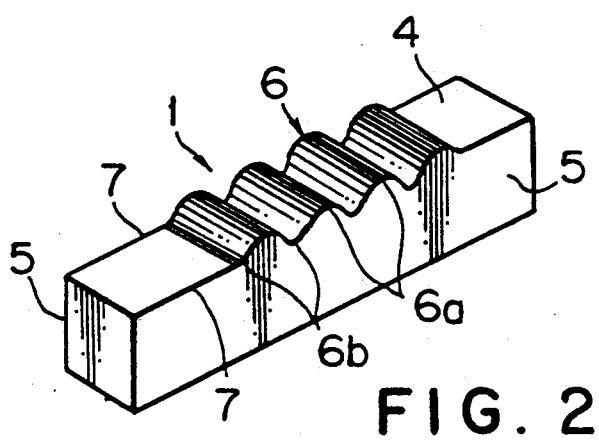
FIG. 2 is a perspective view showing the structure of a forming die.
Figure 3:
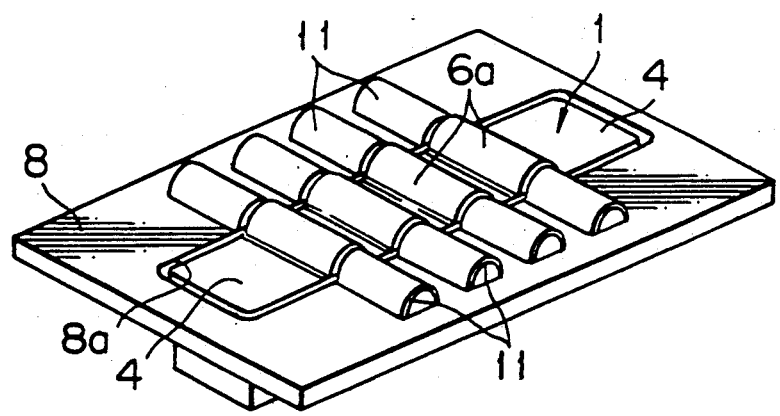
FIG. 3 is a perspective view indicating the relationship between auxiliary forming ridges and a reference forming surface of the forming die.

As indicated in FIGS. 2 and 3, the stationary forming die 1 is provided with a reference forming surface 4 and flange forming surfaces 5 that extend downwards from both sides of the reference forming surface 4. The reference forming surface 4 is formed with crests 6a and valleys 6b that form wave-shaped undulations 6 that are wave-shaped in section along the length of the die 1, so that the common edges 7 of the surface 4 and the surfaces 5 are curved.

Figure 1C:
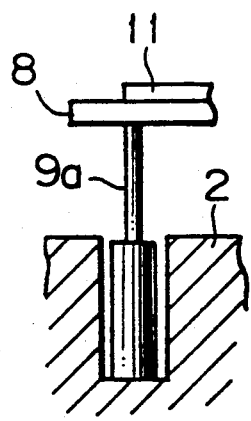
FIG. 1c is a fragmentary view showing a modification of the apparatus of FIG. 1.

As indicated in FIGS. 1 and 3, an auxiliary forming die 8 is disposed on an outer periphery of the stationary forming die 1. The auxiliary forming die 8 has an opening 8a in its central portion and through which the forming die 1 passes. As indicated in FIG. 1, the auxiliary forming die 8 is always urged in the upward direction by the urging force of a spring 9 mounted between the auxiliary forming die 8 and the base 2. A hydraulic mechanism 9a (FIG. 1c) may be used instead of the spring 9. A depressing die 10 to be described later, presses the auxiliary forming die 8 from above so that the die 8 can be lowered to stop at a predetermined height position. In the embodiment of the present invention, a mechanism for raising and lowering the auxiliary forming die 8 is constituted by either the spring 9 or the hydraulic mechanism 9a.

As indicated in FIG. 3, the top surface of the auxiliary forming die 8 has auxiliary forming ridges 11 each having an upwardly convex semicylindrical shape and aligned with the crests 6a of the wave-shaped undulations 6. The ridges 11 are integral with the auxiliary forming die 8 and rise and fall with the die 8.

Figure 4:
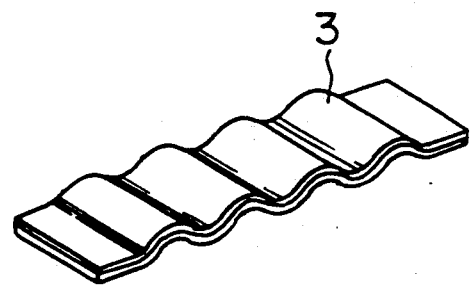
FIG. 4 is a perspective view showing a prepregnated material.

The prepregnated material sheet 3 is formed of a fiber-reinforced composite material that has meshes of fibers laminated into several to several tens of layers and, as indicated in FIG. 4, is formed in a wavy shape according to the wave-shaped undulations 6. The prepregnated material sheet 3 is placed on the top surface of the forming die 1 and the auxiliary forming die 8 so that the directions of the fibers form angles of approximately 45° with respect to the common edges 7, and is formed between the forming dies 1 and 8 and the depressing die 10 that presses from the top side.

Figure 1A:
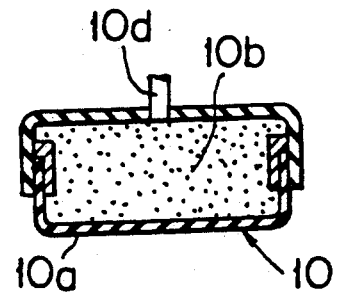
FIG. 1a and FIG. 1b are sectional views of different depressing dies.
Figure 1B:
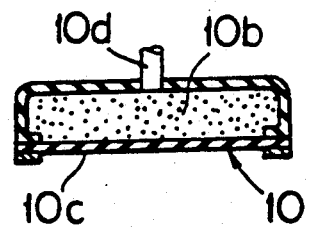

As indicated in FIG. 1a, the depressing die 10 is made from a flexible and heat resistant rubber bag 10a, the inside of which is supplied with compressed air 10b at a high or room temperature via a pipe 10d. As indicated in FIG. 1b, the depressing die 10 may be made from a flexible and heat resistant flat bag 10c, the inside of which is supplied with compressed air 10b at a high or room temperature. The rubber bag 10a swells when compressed air 10b is supplied into it, and presses downwards against the prepregnated material sheet 3. The pressing force causes the prepregnated material sheet 3 to first be pressed against the reference forming surface 4 and forms the reference surface of the prepregnated material sheet 3. Furthermore, by increasing the pressure of the compressed air 10b, the end portions of the prepregnated material 3 sheet extending beyond the flange forming surfaces 5 are held from above and below by the rubber bag 10a and the auxiliary forming die 8. Thereafter the auxiliary forming die 8 is lowered against the force of the spring 9 so that the flange forming surfaces 5 form flanges of the prepregnated material 3.

Figure 6:
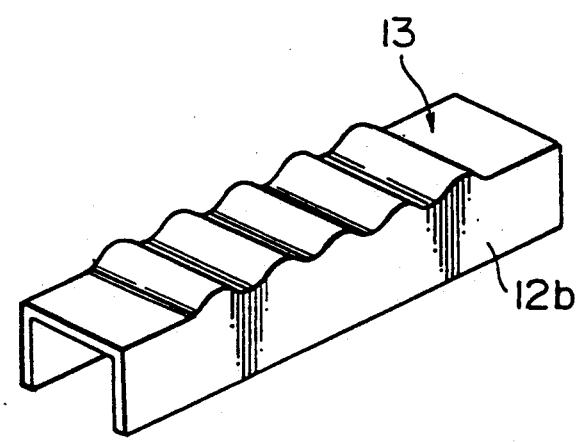
FIG. 6 is a perspective view of a final product.

FIG. 6 indicates a formed product 12 having flanges 12b and extra portions 12a immediately after the forming as described above, and FIG. 6 indicates a finished product 13 after the extra portions 12a have been removed.

The following is a description of the method of bending and forming a composite material sheet using the bending and forming apparatus described above.

Figure 7:
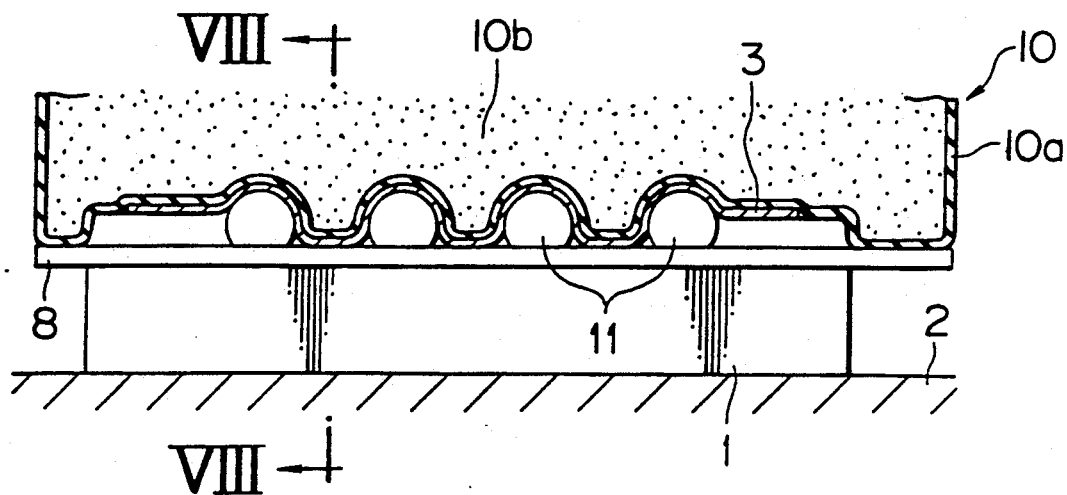
FIG. 7 is a view for describing the status of initial forming of the composite material by the apparatus of FIG. 1.
Figure 8:
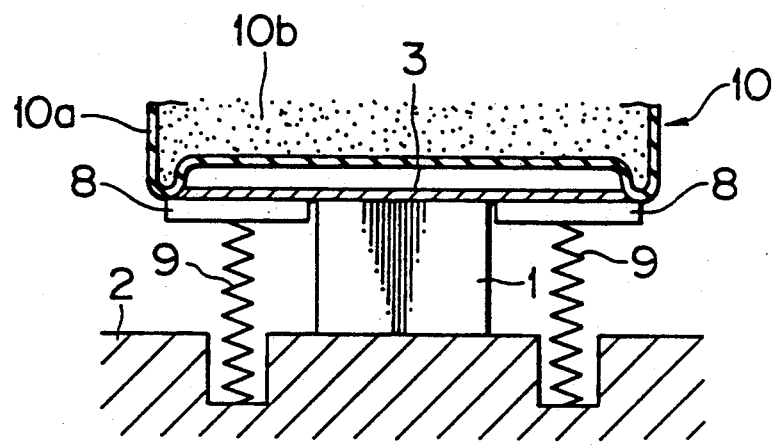
FIG. 8 is a section along lines VIII—VIII of FIG. 7.
Figure 9:
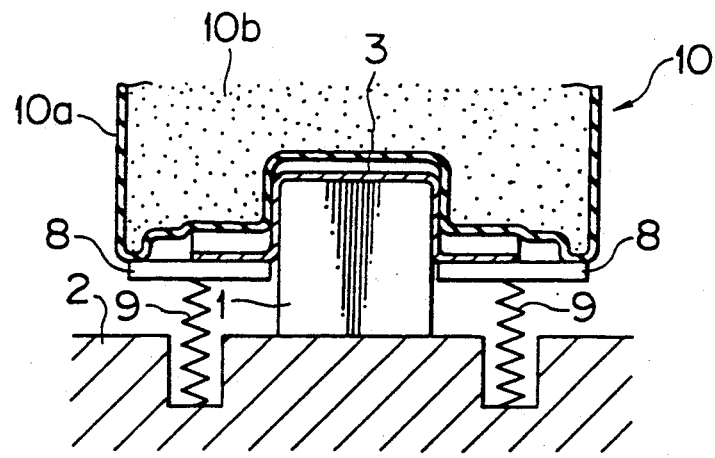
FIG. 9 is a view similar to FIG. 8, but showing a status of intermediate forming of the composite material.

First, the prepregnated material sheet 3 as indicated in FIG. 4 is mounted on the forming die 1 and the auxiliary forming die 8 in the status indicated in FIG. 1, and are pressed from above by the depressing die 10 in the manner that has already been described. By this, as indicated in FIGS. 7 and 8, the prepregnated material sheet 3 is brought into close contact with the top surface of the auxiliary forming ridges 11, the auxiliary forming die 8 and the reference forming surface 4 of the forming die 1, so as to form the reference surface thereon.

Then, the pressure of the compressed air 10b in the rubber bag 10a is either increased, or the urging force of the spring 9 or the hydraulic mechanism 9a is mechanically lessened, whereby the auxiliary forming die 8 gradually lowers and the forming of the flanges 12b by the flange surfaces 5 is carried out.

During the forming, the end portions of the prepregnated material sheet 3 extending beyond the flange forming surfaces 5 are held from above and below by the auxiliary forming die 8 and the depressing die 10 and are thereby pulled downwards by the lowering of the auxiliary forming die 8. The provision of auxiliary forming ridges 11 on the auxiliary forming die 8 serves to plastically extend or stretch the portions of the sheet 3 corresponding to the valleys 6b of the wave-shaped undulations 6, towards the auxiliary forming ridges 11. Thus, no creases or lines are produced on the surfaces of the formed flanges 12b. This will be described later in more detail.

Figure 10:
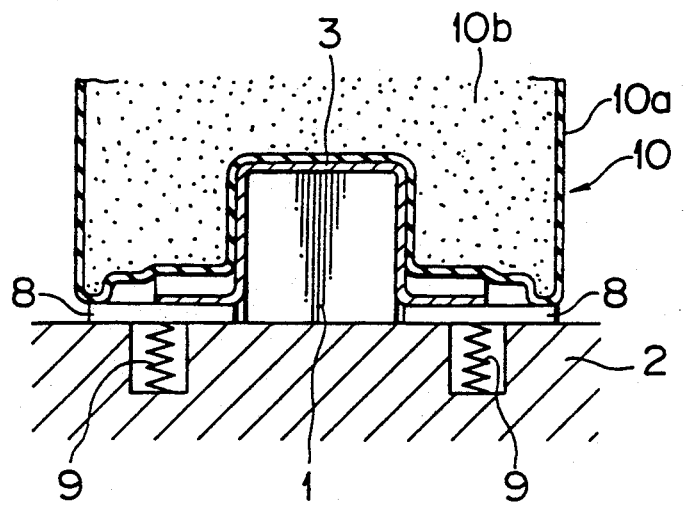
FIG. 10 is a view similar to FIG. 8, but showing a status of final forming of the composite material.

When the auxiliary forming die 8 is lowered to the lower end as indicated in FIG. 10, then compressed air of room temperature or a cool air 10b is supplied to the inside of the rubber bag 10a to cool the rubber bag 10a and the prepregnated material sheet 3. Moreover, the forming die 1 is cooled from the side of the base 2.

Figure 5:
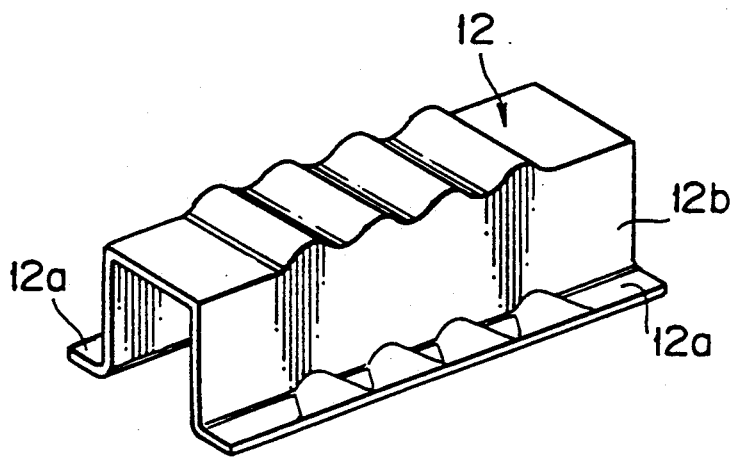
FIG. 5 is a perspective view of a product formed by the apparatus of FIG. 1.

When the prepregnated material sheet 3 has cooled sufficiently, the pressing force of the depressing die 10 is cancelled and the forming is completed. The finished product shown in FIG. 5 is therefore obtained. Then, the lower ends of the flanges 12b are cut to produce the finished product indicated in FIG. 6.

The following is a description of the generation of creases and lines.

Figure 11:
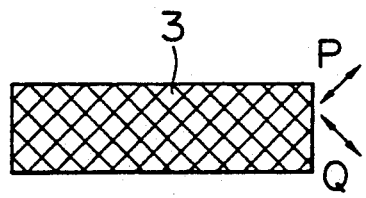
FIGS. 11 and 12 are views showing the direction of elongation of the prepregnated material.
Figure 12:
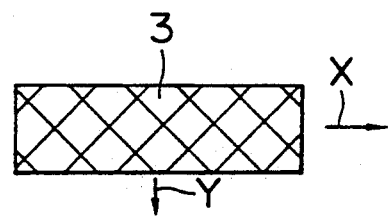
Figure 13:
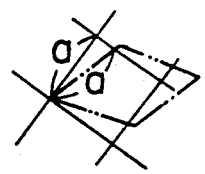
FIG. 13 is an enlarged view explaining the elongation of the prepregnated material.

The fibers of the prepregnated material sheet 3 are laminated in a mesh pattern as indicated in FIG. 11 and the prepregnated material 3 cannot stretch in the directions indicated by the arrows P and Q since the fibers have no elasticity. When the prepregnated material sheet 3 is pulled in the directions indicated by the arrows X and Y in FIG. 12, the square mesh of the prepregnated material sheet 3 as indicated by the solid lines, is changed into the diamond-shaped mesh indicated by the broken lines in FIG. 13, as if the fibers themselves had stretched.

Figure 14:
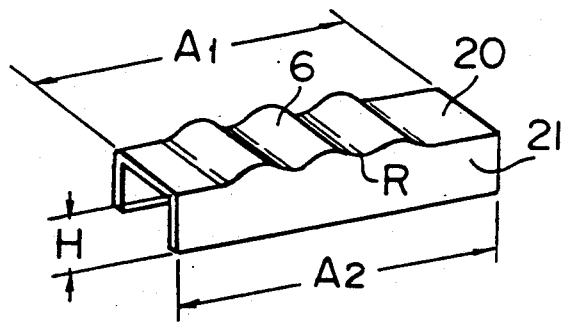
FIG. 14 is a perspective view showing the formed status of a prepregnated material.

When the prepregnated material sheet 3 is formed into the shape indicated in FIG. 14, if the length of the reference surface 20 is $A_1$ and the lengths of the flange surfaces 21 are $A_2$, then the reference surface 20 becomes longer by the amount of the wave-shaped undulations 6 so that $$A_1 > A_2 \tag{1}$$

Figure 15:
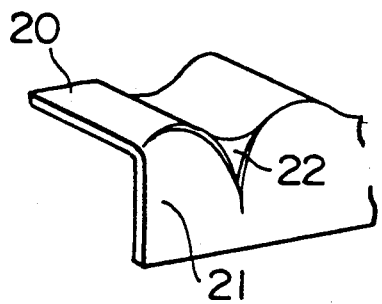
FIG. 15 is a fragmentary perspective view showing creases and lines generated in the prepregnated material.

Accordingly, when the forming is simply performed, a surplus of the material by the amount of the difference $A_3$ between both ($A_3 = A_1 - A_2$) occurs in the flange surfaces 21, and this causes creases and lines 22 to appear as indicated in FIG. 15. The creases and lines 22 occur in portions of the flange surfaces 21, corresponding to the valleys 6b of the wave-shaped undulations 6.

A further explanation will be made in this connection.

Figure 16:
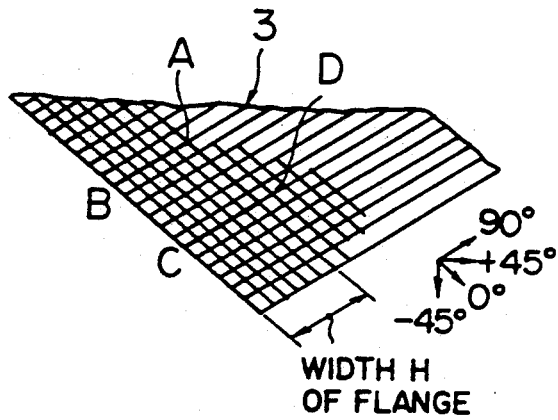
FIGS. 16 through 19 are views describing the mechanism of generation of creases and lines in portions of the flange forming surfaces, corresponding to valleys.
Figure 17:
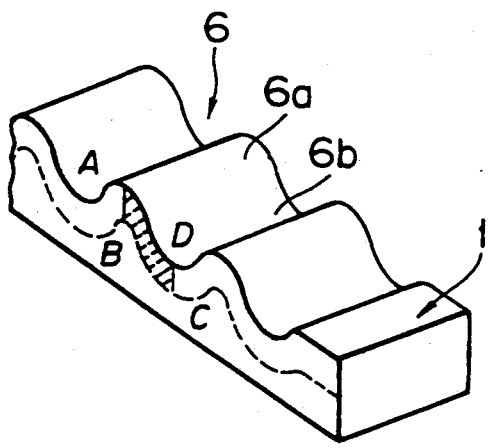

It is assumed that a prepregnated material sheet 3 that is laminated in a flat plane has grid lines at the same pitch, as indicated in FIG. 16. It is further assumed that when forming of the reference surface 20 is performed, a grid line A-B indicated in FIG. 16 is aligned with the center line of the height of each crest 6a, as indicated in FIG. 17, and then the flange surfaces 21 are formed.

Figure 18:
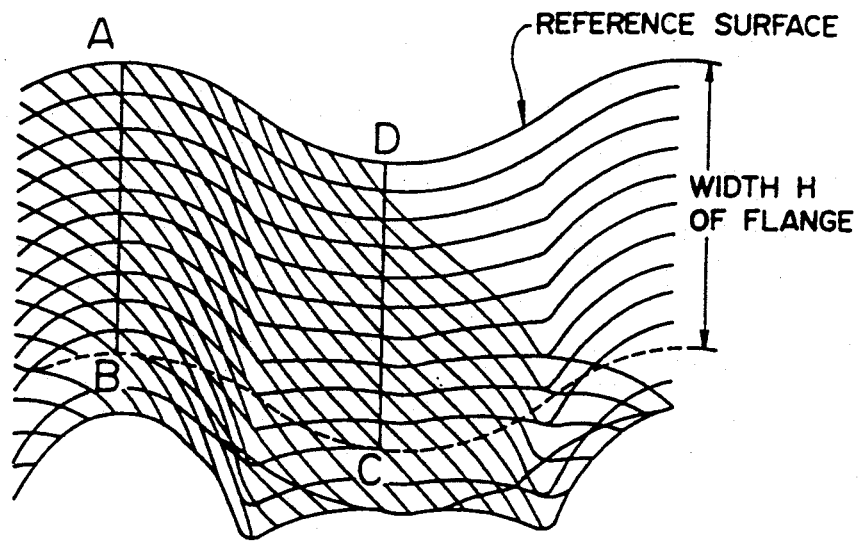

Here, supposing that the direction of 90° indicated in FIG. 16 is bent straight downwards to perform the forming without any change in the area defined by lines connecting the points A, B, C and D, then the flange surfaces 21 would appear as indicated in FIG. 18.

Figure 19:
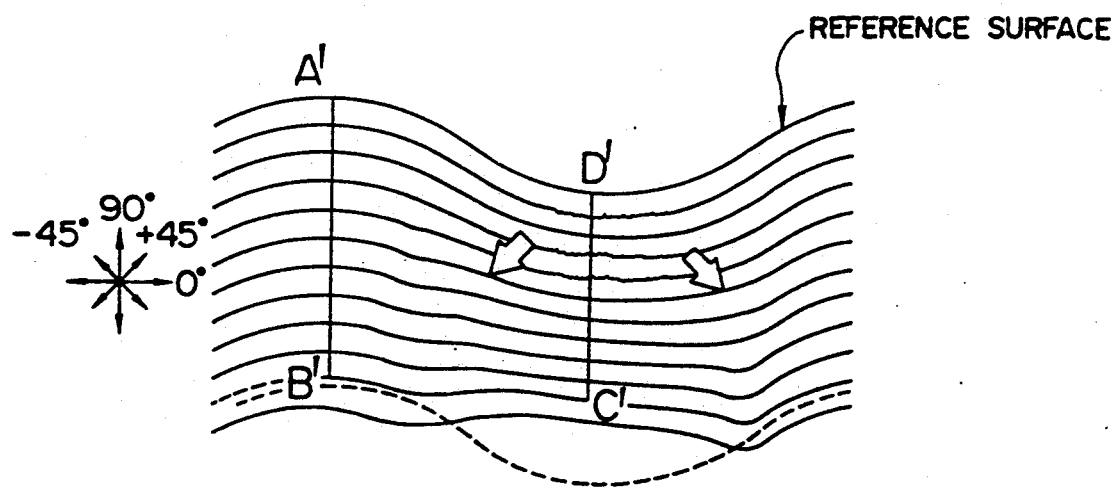

However, in reality, the length of the fiber A-C in the −45° direction (FIG. 16) cannot lengthen in the direction indicated in FIG. 18. Accordingly, if the length of each of the fibers in −45° direction is replaced by their actual lengths, then the result is as indicated by A'-B'-C'-D' in FIG. 19. When this occurs, the density of the fibers C'-D' in the −90° direction is relatively large when compared to that of the fibers C-D in the valley portion in FIG. 18. This means that the fibers are more concentrated. The creases and lines 22 will occur if the fiber density becomes excessive.

It is therefore necessary to spread the fibers in the ±45° direction for preventing occurrence of the creases and lines 22. Pulling only in the 90° direction (i.e. straight down) is not desirable as creases will occur in the ±45° direction in the vicinity of flange corners R (in FIG. 14) of the valleys 6b.

Figure 20:
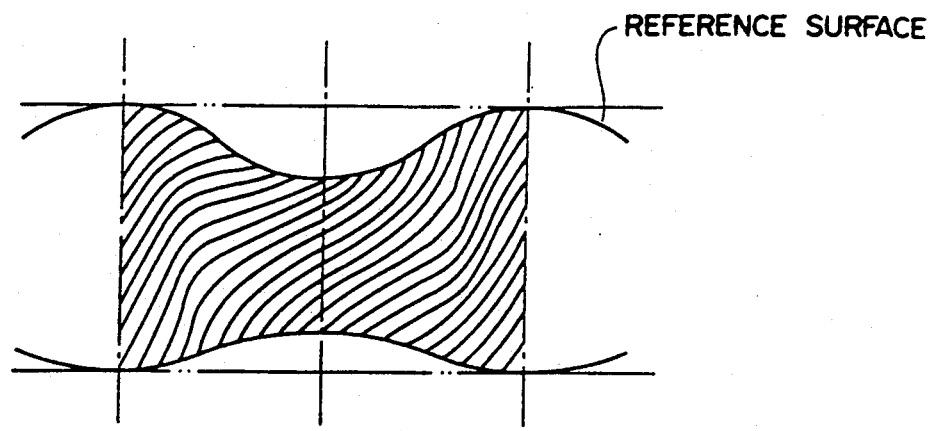
FIG. 20 is a view showing the lay of the fibers in a +45° direction when the fibers are extended so that creases and lines are not formed.

FIG. 20 indicates the lay of the fibers in the ±45° direction when the fibers are spread by the above method. This is the same situation as a manual laying for forming without creasing.

From the above, the following two methods can be considered for preventing creases and lines 22 from generating in the flange surfaces 21.

The first method is to spread the portions of the prepregnated material sheet 3 in the valleys 6b in the ±45° direction and to pressing them to the forming die, and the second method is to spread the fibers in the valleys 6b in the ±45° direction prior to forming of the crests 6a.

One means of realizing the first method could be to clamp the prepregnated material sheet 3 and to mechanically pull it. In the case of manual lay up, hands are used instead of clamps so that arbitrary pulling can be made, but it is extremely difficult and impractical to incorporate into a forming machine a clamping mechanism having an equivalent function.

On the other hand, one possible means of realizing the second method is the use of the auxiliary forming die 8 as in the first embodiment described above, the forming die 8 having auxiliary forming ridges 11 fulfilling certain conditions, on the upper surface thereof.

Figure 21:
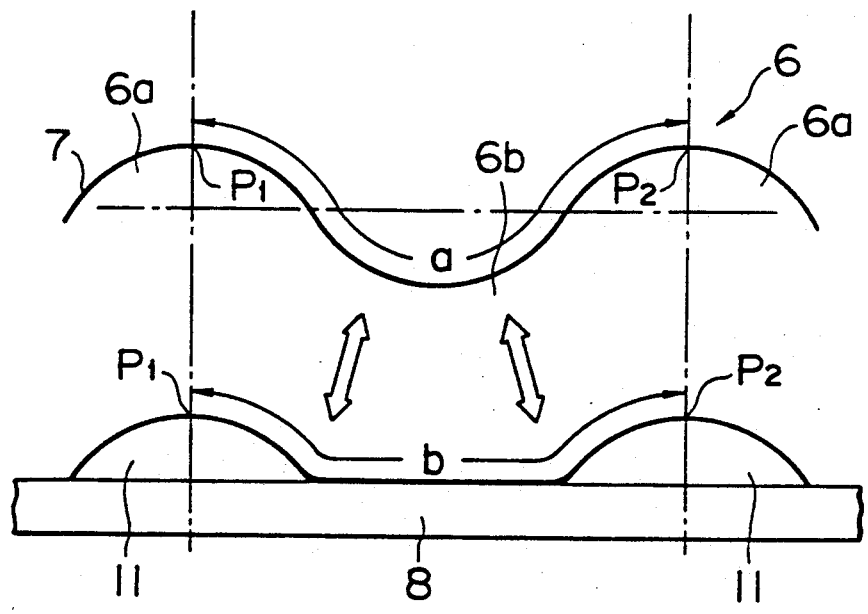
FIG. 21 is a view showing conditions of auxiliary forming ridges for obtaining the lay of the fibers indicated in FIG. 20.

More specifically, in FIG. 21, the length of the surface of the wave-shaped undulations 6 between the peaks P₁ and P₂ of the crests 6a, i.e., the length of the common edge 7 is indicated by a, and the corresponding length of the surface of the auxiliary forming ridges 11 is indicated by b. Then, the auxiliary forming ridges 11 are set so that $$a \leq b \qquad (2)$$

Figure 22:
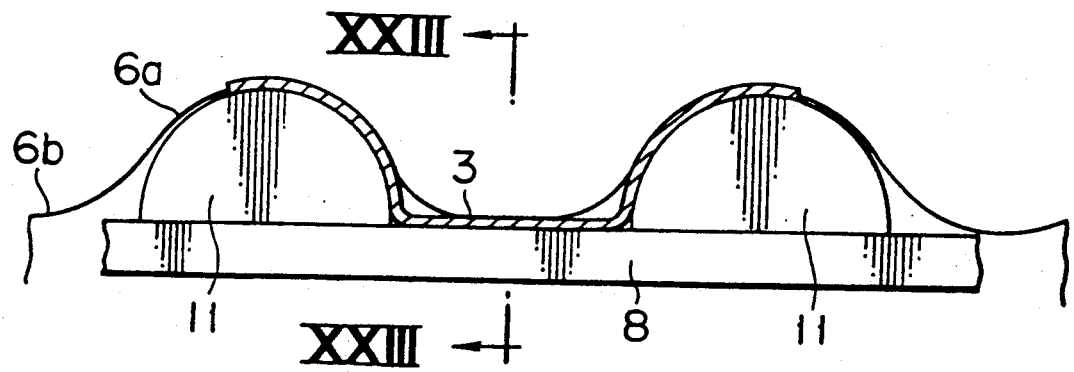
FIG. 22 is a view showing the status for forming a prepregnated material under the above conditions.
Figure 23:
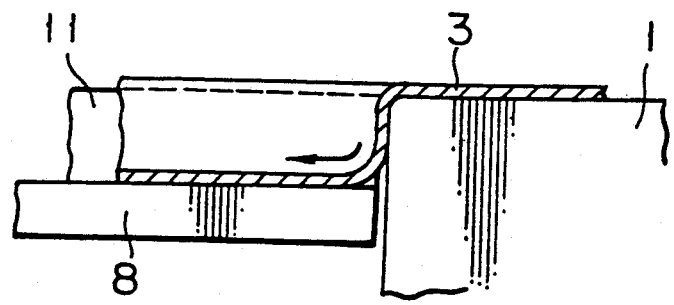
FIG. 23 is a sectional view taken along line VIII—VIII of FIG. 22.

When the prepregnated material sheet 3 is formed as indicated in FIGS. 22 and 23, the material sheet 3 in the portions of the valleys 6b is pulled toward the lower portions between the auxiliary forming ridges 11 and the same effects as in manual laying up is obtained.

Figure 24:
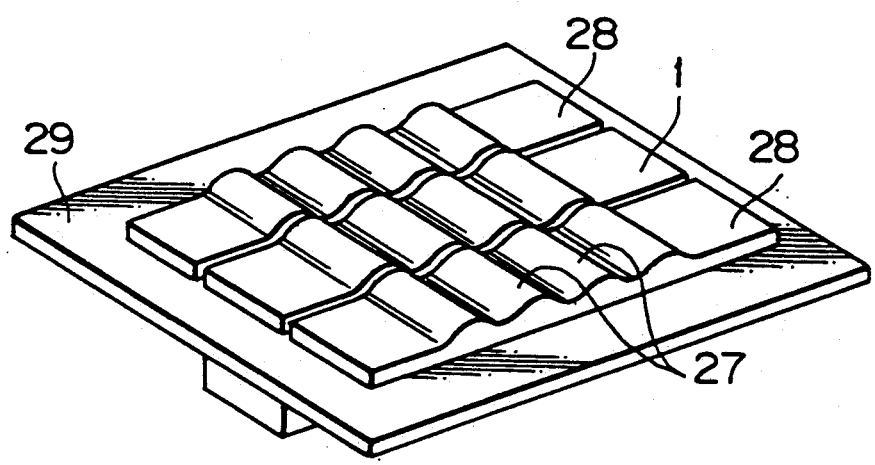
FIG. 24 is a view corresponding to FIG. 3, but showing a second embodiment of the apparatus of the present invention.

FIG. 24 indicates a second embodiment of the present invention. Here, instead of the auxiliary forming ridges 11 and the auxiliary forming die 8 of the first embodiment, a band-shaped auxiliary forming members 28 are used. Each member 28 has integral forming ridges 27 and is secured to an auxiliary forming plate 29.

In this case as well, the same effect as described for the first embodiment can be obtained as long as the relationship indicated in FIG. 21 is fulfilled.

Figure 25A:
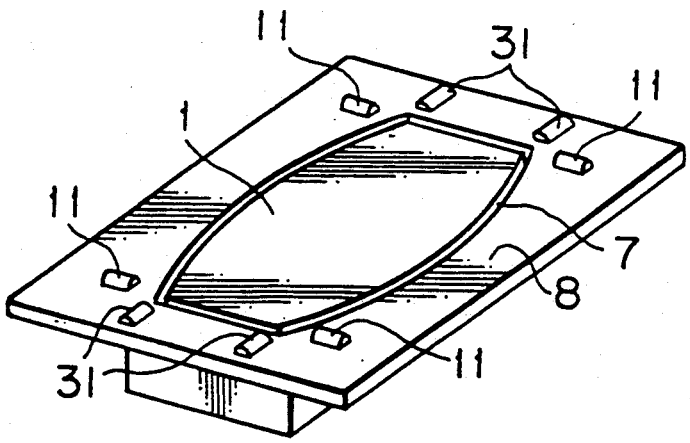
FIGS. 25a and 25b are perspective views corresponding to FIG. 3, but indicating third and fourth embodiments of the present invention, respectively.
Figure 26A:
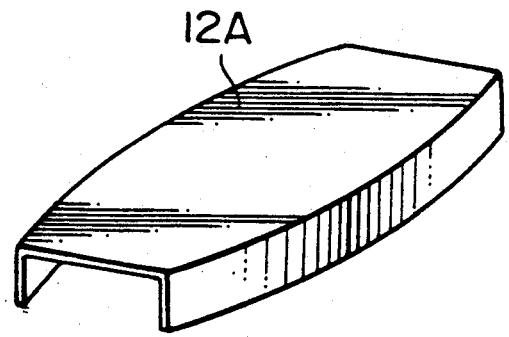
FIGS. 26a and 26b are perspective views showing finished products formed by the apparatus indicated in FIGS. 25a and 25b, respectively.
Figure 25B:
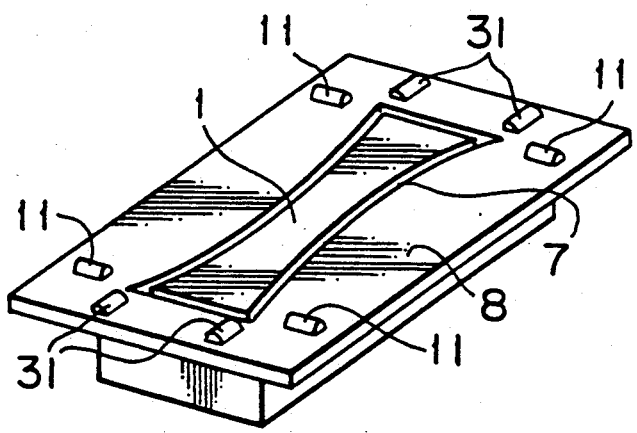
Figure 26B:
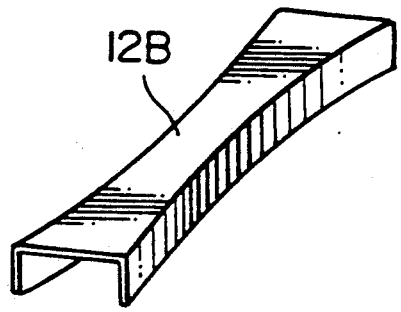

FIGS. 25a and 25b show a third embodiment of the present invention. In this embodiment, the common edge 7 between the reference forming surface 4 and the flange forming surfaces 5 of the forming die 1 has a convex or concave curve. By using the bending and forming apparatus according to this embodiment, finished products 12A and 12B indicated in FIGS. 26a and 26b are obtained without the formation of creases or lines.

In this embodiment, auxiliary forming ridges 31 are provided on the upper surface of the auxiliary forming die 8 for causing the longitudinal ends of finished products 12A and 12B to be closed to shape a box.

As has been described above, according to the method of the present invention, the prepregnated material sheet is placed so that the directions of the fibers are angled at approximately 45° with respect to the common edge of the reference forming surface and the flange forming surfaces of the forming die, and the prepregnated material sheet is formed by pressing the material sheet on the top surfaces of the stationary forming die and the auxiliary forming die by means of the depressing die. Then the auxiliary forming die is lowered with the side portions of the prepregnated material sheet being held between the depressing die and the auxiliary forming die. Therefore, the prepregnated material sheet is held sufficiently closely against the flange forming surfaces of the forming die and is bent and formed, while the auxiliary forming ridges pull the prepregnated material sheet so that there is no slack of the material whereby the formation of creases and lines is prevented even in cases where the common edges between the reference surface and the flange surfaces are curved.

According to the apparatus of the present invention, the length of the surface in a predetermined range of the auxiliary forming ridges of the auxiliary forming die is made equal to or longer than the length of the common edges of the reference surface and the flange surface of the forming die. Therefore, it is possible to perform bending and forming of a composite material sheet so that no creases or lines occur even in the case where the reference surface is undulating.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method of bending and forming a composite material sheet made from laminated meshes of inelastic fibers, into a product of U-shaped cross section having a reference surface and pair of flange surfaces bent angularly along opposite curved longitudinal edges of the reference surface, said method comprising:

placing said composite material sheet onto a stationary forming die having an upper reference forming surface and flange forming surface extending downward from opposite curved longitudinal edges of said reference forming surface and onto a downwardly movable auxiliary forming die surrounding said stationary forming die and having convex auxiliary forming ridges on an upper surface thereof, with said fibers of said composite material sheet forming an approximately 45° relative to said edges of said reference forming surface;

pressing the composite material sheet downward against said stationary forming die and against said auxiliary forming die by means of an expandable elastic depressing die to shape an inner part of said composite material sheet on said upper reference forming surface of the stationary forming die into conformity with said upper reference forming surface, and to deform outer parts of said composite material sheet extending outward beyond said longitudinal edges of said reference forming surface into conformity with said auxiliary forming ridges, so as to shape said reference surface of the product;

further pressing the composite material sheet by said depressing die to move said auxiliary forming die downward with said outer parts of the composite material sheet being held between said depressing die and said auxiliary forming die, thereby to form the flange surfaces of the product; and pulling and stretching said parts of the composite material sheet by said auxiliary forming ridges in such directions as to lower the density of the fibers, during at least one of said pressing steps so as to prevent creases and lines form being formed.

2. The method according to claim 1, further comprising:

supplying pressurized air into said elastic depressing die to pneumatically expand said depressing die, thereby to press said depressing die against said stationary and auxiliary dies.

3. The method according to claim 1, wherein said pulling and stretching are performed in directions substantially across the direction in which said fibers extend.

4. The method according to claim 1, wherein said reference forming surface has a wave-shaped surface and said pulling is performed from valleys of said wave-shaped surface toward lower portions between adjoining ones of said auxiliary forming ridges for forming a wave-shaped reference surface and flat flange surfaces.

5. The method according to claim 1, wherein said reference forming surface is flat and said pulling is performed in a longitudinal direction of the product for forming a flat reference surface and curved flange surfaces.

6. The method according to claim 1, further comprising:

supplying pressurized air into said elastic depressing die to pneumatically expand said depressing die, thereby to press said depressing die against said stationary and auxiliary dies.

7. The method according to claim 6, further comprising:

cooling said composite material sheet of the product after lowering said auxiliary forming die.

8. The method according to claim 7, wherein said cooling step comprises:

supplying cool air into said elastic depressing die to cool said product via cooling said elastic depressing die.

9. The method according to claim 7, further comprising:

cutting off lower ends of said flanges, respectively, to produce a finished product.

10. A method for bending and forming a composite material sheet made from laminated meshes of inelastic fibers into a product of U-shaped cross section by means of a forming device having a stationary forming die including an upper reference forming surface and a pair of flange forming surfaces extending downward from opposite longitudinal edges of the upper reference forming surface, respectively, a downwardly movable auxiliary forming die surrounding said stationary forming die, and a expandable elastic depressing die provided over said stationary forming die, said product having a reference surface and a pair of flanges bent angularly along opposite longitudinal edges of said reference surface, respectively, said method comprising:

forming said reference surface of the product at the center of said composite material sheet by pressing said composite material sheet downward by means of said expandable elastic depressing die against said stationary forming die;

forming convex portions on end parts of said composite material sheet extending beyond said longitudinal edges of said upper reference forming surface in the association with auxiliary forming ridges located on the upper surface of said auxiliary forming die in the vicinity of the portions where creases and lines occur, by pressing said end parts between said expandable elastic depressing die and said auxiliary forming die; and pulling and stretching said convex portions to reduce the density of the fibers therein so as to prevent said product from producing creases and lines while bending said end parts downwardly by lowering said auxiliary forming die relative to said expandable elastic depressing die for forming said pair of flanges of the product.

11. The method according to claim 10, wherein said reference forming surface has wave-shaped undulations and said auxiliary forming ridges are provided to align with said wave-shaped undulations, respectively, whereby an area on said end parts of the composite material sheet between adjoining auxiliary forming ridges is pulled downward to spread the density of the fibers.

12. The method according to claim 10, further comprising:

placing the composite material sheet on said stationary forming die and said auxiliary forming die so as to locate the fibers of said composite material sheet with a certain angle relative to said longitudinal edges of the upper reference forming surface before said forming steps.

13. The method according to claim 12, wherein said certain angle is 45°.

14. The method according to claim 10, wherein said pulling and stretching are performed in directions substantially across the direction in which said fibers extend.

* * * * *